INVENTORS
John V. Becker
Arthur A. Bellinger

AGENT

INVENTORS
John V. Becker
Arthur A. Bellinger

BY Harold L. Gammons

AGENT

United States Patent Office 3,734,761
Patented May 22, 1973

3,734,761
PROCESS FOR PRODUCING TITANIUM DIOXIDE PRODUCT CONTAINING ALUMINUM OXIDE
John V. Becker, New York, N.Y., and Arthur A. Bellinger, Willingboro, N.J., assignors to National Lead Company, New York, N.Y.
Filed Jan. 21, 1971, Ser. No. 108,438
Int. Cl. C01g 23/04
U.S. Cl. 106—300                    2 Claims

ABSTRACT OF THE DISCLOSURE

A metal compound is prepared by melting a metal in a high temperature heating zone, atomizing the molten metal and reacting the atomized metal with a gas to produce a metal compound.

BACKGROUND OF THE INVENTION

Metal compounds and in particular aluminum chloride are important additives in the manufacture of titanium dioxide by the reaction of titanium tetrachloride with oxygen, or an oxygen-containing gas in that the aluminum chloride promotes the formation of rutile and improves pigmentary properties.

Various techniques have been used in the past for producing aluminum chloride for the aforesaid purposes including reacting chlorine at elevated temperatures with a soid aluminum metal, either in the form of sizeable lumps or as finely divided powder.

It is well known, of course, that the reaction between aluminum metal and chlorine is strongly exothermic. For this reason it is difficult to control and local overheating occurs frequently in which case the aluminum metal sinters or melts forming fairly large lumps which impede the reaction and aggravate the charging of additional aluminum metal into the reactor. Moreover the molten aluminum metal has been known to alloy with the material of the reactor wall thus damaging the reactor and in addition local overheating creates hot gases containing chlorine which at these high temperatures cause corrosion of the reactor walls and hence contamination of the aluminum chloride. At colder places in the reactor the aluminum chloride will condense and cause clogging. These and similar problems are costly both from the standpoint of maintenance and down-time and hence existing generators require extremely close surveillance to function even moderately well.

In U.S. Pat. No. 2,385,505 it is suggested that a vertically arranged reactor be filled with aluminum pieces and that chlorine be introduced from below for controlling the heat of reaction. In this process the chlorine is poorly distributed in the static aluminum bed. Furthermore, special devices are needed to prepare the chlorine-aluminum chloride mixture, and the utilization of elevated pressures is concommitant with high apparatus costs.

According to U.S. Pat. No. 3,078,145 pieces of aluminum metal are placed on a perforated plate through which the chlorine flows upwardly from below. Should the flow of chlorine be too great and cause local overheating some of the aluminum melts and flows down through the perforated plate where it is contacted by the entering gaseous chlorine which, as a consequence, is partly consumed so that the rate of reaction is diminished. However, this method for controlling the rate of reaction is complex, difficult to maintain and if corrosion resistant materials are not employed, considerable corrosion occurs caused by the molten aluminum.

It is of great importance for the continuous manufacture of titanium dioxide by the so-called vapor phase process to maintain a continuous uniform flow of aluminum chloride to the vapor phase reactor in a relatively simple and economical manner. This problem has not been solved in a satisfactory manner by the processes just described.

SUMMARY OF THE INVENTION

In its broadest aspects the invention contemplates melting a metal, atomizing the molten metal and reacting a gas with the atomized metal to form a vaporous metal compound. Atomization of the molten metal may be done by an inert gas such as nitrogen. However especially satisfactory results have been achieved using the reactant gas itself.

Moreover while any conventional method may be used to heat the metal to a temperature sufficient to melt it as for example using heated crucible, an electric resistance furnace, plasma flame and the like it has now been discovered that many of the disadvantages of earlier techniques can be overcome by the relatively simple expedient of continuously feeding a metal wire, as for example aluminum wire, into a heating zone maintained at a sufficiently high temperature to melt the metal wire; and simultaneously introducing a stream of reactant gas, as for example, chlorine, with or without an inert gas, as the case may be, into the heating zone to atomize the molten metal and form the metal compound. The means used for maintaining the requisite high temperature in the heating zone may be an electric arc in which case two continuous lengths of the metal wire are fed into the heating zone in a manner to form consumable electrodes which provide the electric arc in which the metal is melted.

The temperature in the heating zone is nicely controlled by maintaining maximum current flow for a given metal wire feed rate which, in turn, can be readily maintained at a constant rate using conventional wire feed means thus insuring a substantially constant amount of molten metal in the heating zone for any given unit of time. The rate of flow of gas used to atomize and/or react with the molten metal may also be regulated so as to maintain the stoichiometry of the molten metal and reactant gas in the heating zone. In this connection the gas to atomize the molten metal may be the same gas which reacts therewith to form the metal compound. Optionally the gas used to atomize the molten metal may be an inert gas such as nitrogen, or mixture of nitrogen and reactant gas. In either case the atomizing gas, or gases, is fed into the immediate vicinity of the arc both to atomize the molten metal and thoroughly mix it with the reactant gas for reaction therewith. In this connection it has been found that atomized molten aluminum metal is so fine that there are no problems of overheating or malfunctioning due to sintering or alloying of molten metal with the reactor walls. Moreover since the gaseous metal halide is swept out of the heating zone at elevated temperatures there are no problems of plugging due to condensation of the metal halide.

When producing gaseous aluminum chloride according to the present invention for use in a reactor for producing vapor phase $TiO_2$ pigment the hot gaseous aluminum chloride may be fed directly into the reactor in which the reaction between gaseous $TiCl_4$ and oxygen takes place. Since it is desirable to maintain the gaseous metal halide at high temperatures the generator as well as the conduits leading therefrom to the vapor phase reactor are preferably made of or clad with suitable high temperature refractory or ceramic material so as to minimize the corrosive effect of the hot gaseous aluminum chloride. The particular duct-work employed for feeding the hot aqueous aluminum chloride into the reactor may vary depending upon type of burner used, burner installation and other factors; and may include feeding the gaseous aluminum chloride directly into the reactor independently of the gaseous titanium tetrachloride and oxygen; or connecting the respective ducts of the gaseous aluminum chloride, the titanium tetrachloride and the oxygen in a manner such that the gaseous aluminum chloride is thoroughly mixed with the gaseous $TiCl_4$ or the oxygen, as the case may be, immediately before entering the reactor. It is well known, of course, that the reaction of aluminum metal with chlorine is exothermic. However it was found quite unexpectedly that the amount of heat developed is more than sufficient to raise the temperature of either the $TiCl_5$ or $O_2$ to the point where the conversion reaction of these components will occur without the use of auxiliary heat other than that which can be readily supplied with conventional metal tube-gas fired furnace. Thus, the use of expensive preheating equipment is avoided, e.g., CO addition, plasma flame, ceramic tube furnaces or the like.

In brief it has been found that whereas formerly costly high temperature heating means was required to preheat the $TiCl_4$ and oxygen to reaction temperature it is now possible, using the present invention, to preheat the $TiCl_4$ and oxygen to relatively low preheat temperature using relatively inexpensive low temperature heating equipment the additional heat required for reaction of the $TiCl_4$ and oxygen being supplied by the heat of reaction of the atomized aluminum metal and chlorine.

The generator of this invention thus insures production of nicely controlled quantities of a gaseous metal compound, avoids accumulations of unreacted metal, precludes sintering and/or plugging, insures simplified handling of materials, is constructed of relatively inexpensive materials, is economical to operate, and when used in conjunction with a vapor phase reactor for producing pyrogenic $TiO_2$ can develop sufficient heat to effect conversion of the reactants without the need for expensive auxiliary heating.

DESCRIPTION OF THE PREFERRED EMBODIMENT

Figure 1:
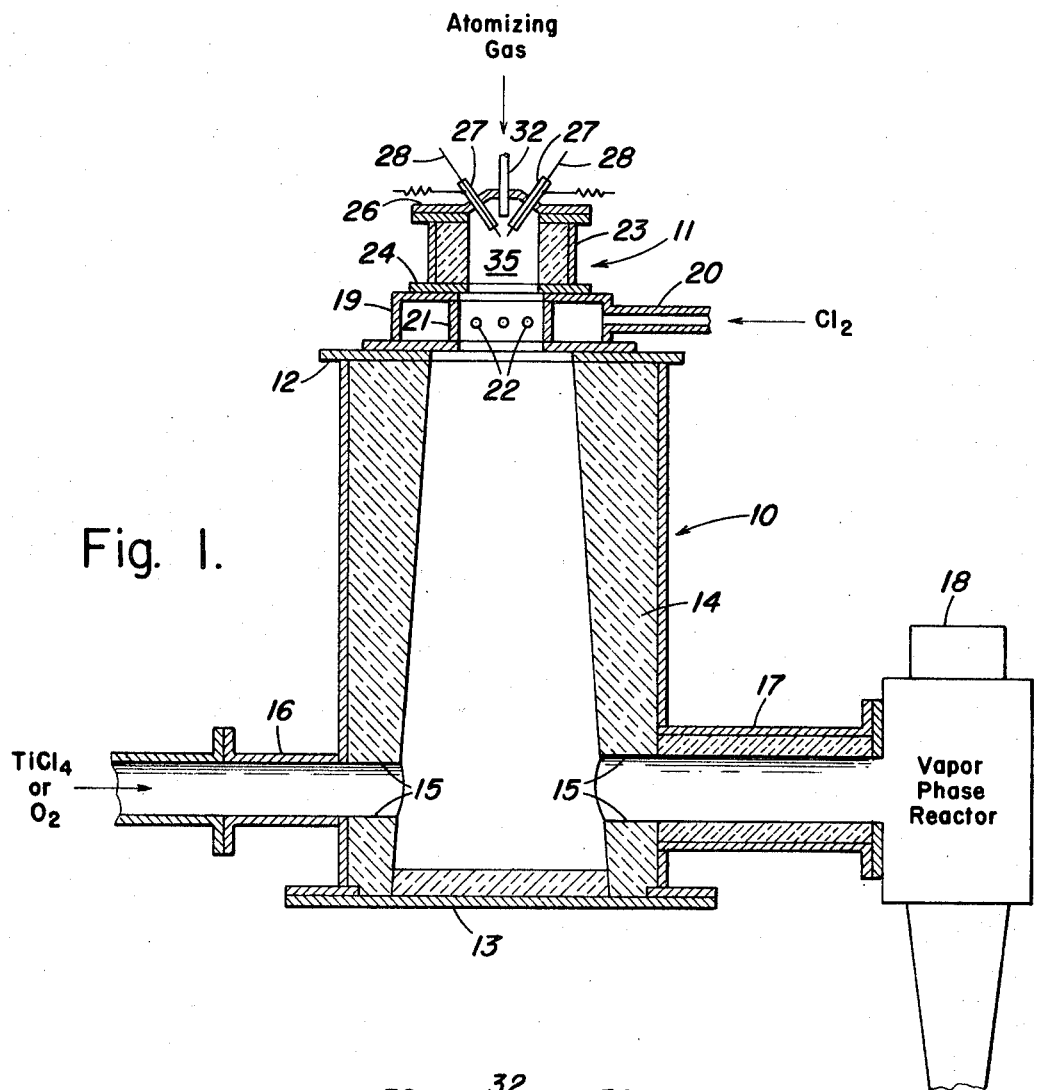
FIG. 1 shows schematically, a vertical elevation in section of one embodiment of a metal compound generator of this invention connected directly to a vapor phase reactor for producing particulate metal oxide particles.

Referring to the drawings, a generator, designed in this instance for the production of gaseous aluminum chloride and mixtures thereof with gaseous $TiCl_4$, comprises a mixing chamber 10 and an atomizing unit indicated generally at 11 both the mixing chamber 10 and atomizing unit 11 being designed to form a generator which is sealed from the atmosphere. The mixing chamber 10 is substantially cylindrical, has a centrally apertured cover plate 12 on its upper end and a closure plate 13 at its bottom. Both the side walls and cover plate of the mixing chamber 10 may be formed of metal such as stainless steel and are lined with a suitable heat insulating material 14 as for example, alumina. The walls of the mixing chamber adjacent its lower end are pierced with diametrically opposite axially aligned apertures 15—15 to permit influx of gaseous $TiCl_4$ or $O_2$, as the case may be, into the mixing chamber 10 by way of a feed pipe 16 and to permit emergence therefrom of a mixture of hot gaseous $TiCl_4$ or $O_2$ and $AlCl_3$ by way of an insulated pipe 17 respectively. The pipe 17 is shown connected directly to a vapor phase burner, indicated schematically at 18, to which the mixture of hot vaporous $TiCl_4$ and $AlCl_3$ is fed for reaction with free oxygen or an oxygen-containing gas and the production of pyrogenic $TiO_2$.

Referring now to the upper end of the mixing chamber 10—mounted on its top plate 12 is the atomizing unit 11 which comprises a doughnut-shaped gas manifold 19 having a radially extending feed pipe 20 for feeding gaseous chlorine into the manifold. The inner annular wall 21 of the manifold is provided with a series of radial apertures 22 whereby gaseous chlorine is introduced into the center of the manifold in the form of a plurality of radial jet streams. Although not so indicated in the drawing it will be understood that the gas manifold 19 may be constructed with double walls to provide water cooling should this be desired.

Mounted atop the doughnut-shaped manifold of the atomizing unit 11 is a spool-shaped chamber 23 in which an electric arc is formed for atomizing one or more aluminum metal wires. The spool-shaped electric arc chamber 23 comprises a cylindrical metal shell having a centrally apertured bottom plate 24. The walls of the electric arc chamber are provided with a silica or cast refractory heat insulating liner the thickness of which is such that the I.D. of the electric arc chamber 23 is slightly smaller than that of the gas manifold 19 with which it is in axial alignment.

Figure 2:
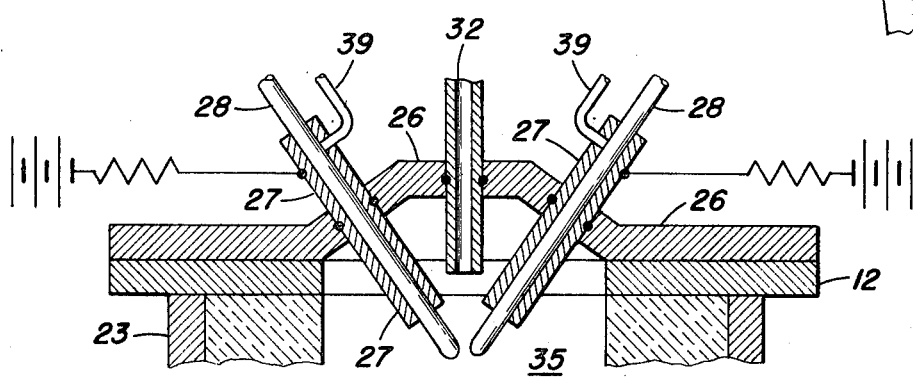
FIG. 2 is an enlarged fragmentary elevation in section of the top-plate and wire-feed sleeves of the atomizing unit of the generator of FIG. 1.

Referring especially to FIG. 2 the top plate 26 of the electric arc chamber 23 is adapted to support two electrode supporting sleeves 27—27 diametrically opposite each other and at an included angle of 90° or less, and to this end the top plate is shaped somewhat like a truncated cone in cross section. Moreover in keeping with the sealed construction of the generator the sleeves 27—27 are secured in the top plate with gas-tight seals or O-rings, as is the atomizing nozzle 32 hereinafter described.

Figure 4:
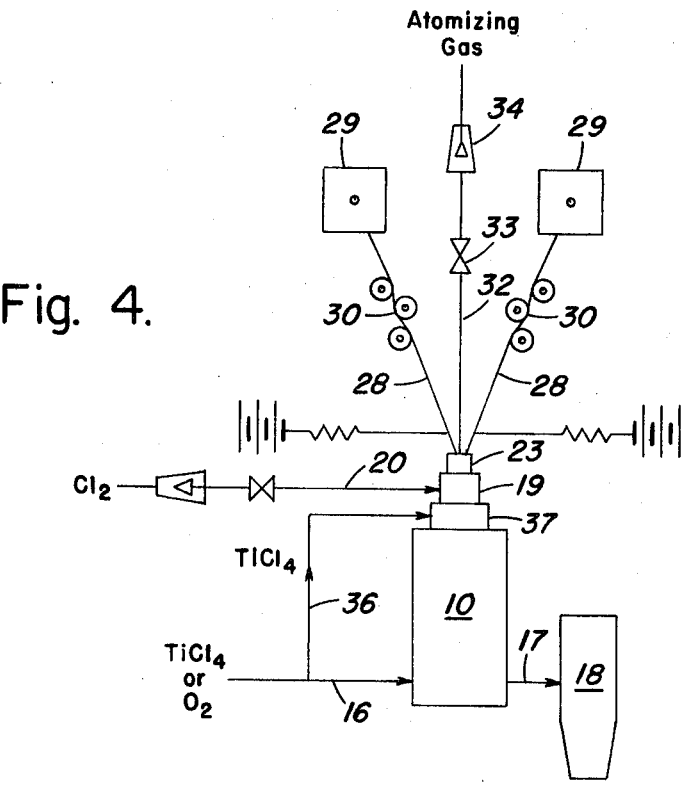
FIG. 4 is a schematic view, on a reduced scale, of the generator and reactor showing the wire feed means and the electric connections to a D.C. power source.

Each electrode supporting sleeve or guide 27 is formed of a current conducting metal and has an axial aperture extending therethrough to accommodate a metal wire 28 which is fed continuously therethrough from suitable dispensers 29 by means of wire feed rolls indicated generally at 30 in FIG. 4. During normal operation the sleeves 27—27 are purged with an inert gas introduced into the sleeves by feed pipes 39—39 to prevent the outflow of reaction products from the generator. The metal used for the guide sleeves 27 is selected to resist burning and/or corrosion at the high temperatures encountered in the atomizing unit and while brass or copper may be used in some applications other metals more resistant to the corrosive atmosphere formed when using chlorine gas are preferred as for example, inconel, copper lined inconel or possibly a ceramic coated metal. It is also within the purview of the invention to cool the guide sleeves by water-jacketing or equivalent means. Each metal wire 28 constitnutes a consumable electrode and to this end electric current is fed to the respective wire electrodes by connecting the respective metal supporting sleeves 27—27 to a D.C. power source (FIG. 4). The metal wires 28—28, in this case aluminum metal wires, are adapted to be fed through the guide sleeves 27—27 at a rate such as to providie substantially the stoichiometric amount of molten aluminum for reacting with the gaseous chlorine. In this connection the atomization of the molten aluminum is effected in any one of several ways as for example by means of an inert gas such as nitrogen, a mixture of nitrogen and chlorine or chlorine gas alone. To this end an atomoizing nozzle 32 having valve 33 and flowmeter 34—see FIG. 4, is connected to the top plate 26 of the electric arc chamber 23 for feeding the atomizing gas into the interior of the electric arc chamber 23, sometimes referred hereinafter as the heating zone 35, in immediate proximity to the inner ends of the spaced wire electrodes 28—28.

In the preferred embodiment the atomizing gas is fed into the heating zone at a positive pressure of about 40 p.s.i.g. or more, thereby to atomize the molten aluminum metal at a rate which is related to the feed rate of the chlorine gas so as to react therewith and form hot gaseous aluminum chloride. The latter passes downwardly into the mixing chamber 10 where it is admixed with preheated gaseous TiCl₄ or oxygen, as the case may be, being fed to the vapor phase reactor 18 via the pipe 17.

As mentioned above it has been found that the temperature produced in the atomizing unit of the generator by reaction of the atomized aluminum metal with the chlorine is extremely high; and that by passing $TiCl_4$ or oxygen, as the case may be, through the mixing chamber the $TiCl_4$ or oxygen will be heated sufficiently to effect conversion within the vapor phase reactor without the need for high temperature preheating. Thus preheating the $TiCl_4$ or oxygen at relatively low temperatures i.e. about 420° C. and 980° C. in conjunction with the heat of reaction of the atomized aluminum metal and chlorine gas will suffice to achieve reaction of the $TiCl_4$ and oxygen without the need for extremely expensive auxiliary heating systems now used. Thus tremendous savings in equipment costs are realized as well as an important simplification in layout and design with accompanying reduction in operational surveillance and malfunction.

Figure 3:
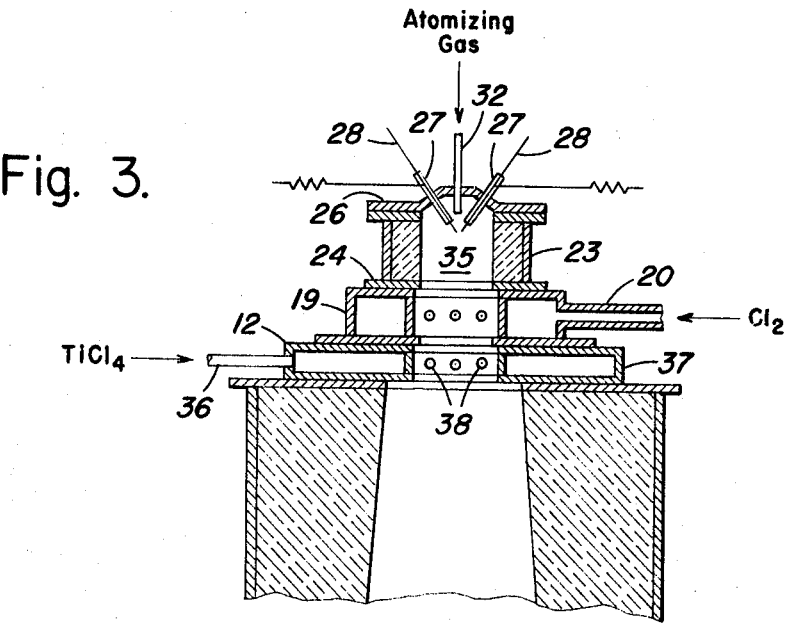
FIG. 3 is a fragmentary vertical elevation in section of a modification of the atomizing unit of FIG. 1.

A modified form of the generator is shown in FIG. 3 wherein part of the gaseous $TiCl_4$ is introduced tangentially into the upper end of the mixing chamber 10 to provide a thin film or curtain of relatively cool gas flowing down the inner wall of the generator so as to preclude deposition of any solid or condensed products thereon. To this end a feed pipe 36 is connected at one end into the $TiCl_4$ supply line 16 and at its other end to an annular $TiCl_4$ manifold 37 provided with a plurality of circumferentially spaced apertures 38 which are arranged to inject streams of gaseous $TiCl_4$ tangentially into the upper end of the mixing chamber 10 to form a relatively cool curtain of gas on the inner wall thereof.

Although in the embodiment shown herein the aluminum chloride generator is connected by a short length of alumina lined piping 17 to a vapor phase reactor, indicated schematically at 18, in which the hot gaseous $TiCl_4$ reacts with oxygen in the presence of the gaseous aluminum chloride to form a pyrogenic $TiO_2$ pigment it is also within the purview of the invention to introduce the hot mixture of gases into the reactor in other ways as for example by mounting the aluminum chloride generator directly on top of the reactor where it would take the place of a conventional three tube burner unit or the auxiliary heating means of the so-called hot gas burner.

In a practical embodiment of the invention the mixing chamber 10 was a metal shell lined with an alumina refractory and measured about 6 feet long and 1.5 feet in diameter the I.D. of the alumina lining being about 1 foot. The metal electrode supporting sleeves 27—27 were fixedly mounted in the top plate 26 of the chamber at an included angle of about 25° having an overall length of about 5 inches. The I.D. of each sleeve was only slightly larger than the O.D. of the metal wire consumable electrodes 28—28 which, in one case where No. 11 gauge aluminum wires, so as to slideably support the electrodes for longitudinal movement therein. In this connection it was found desirable to lubricate the wires to preclude galling.

The wire electrodes 28—28 were connected via the metal sleeves 27—27 to a D.C. source and were continuously fed from a supply source i.e. dispensers 29—29 by wire feed rolls 30—30 to maintain a predetermined and uniform spacing of the electrodes for maintaining a constant electric arc in the heating zone 35 of the generator. The molten aluminum was atomized with chlorine gas fed into the heating zone at a rate depending on the quantity of $AlCl_3$ desired. The feed rates of the aluminum wires and chlorine gas were adjusted to give the desired ratio of aluminum chloride to gaseous $TiCl_4$ required for producing $TiO_2$ pigment of optimum pigmentary properties at a given tonnage per day. In general the chlorine was fed at a rate to give about 1.2 times the stoichiometric requirement based on the formula: $Al° + 1.5Cl_2 \rightarrow AlCl_3$.

For a reactor operating at the rate of 40 tons/day pigmentary $TiO_2$ the feed rate of the chlorine was about 9.6 s.c.f.m. Using No. 11 gauge aluminum wire the feed rate of the aluminum wires was about 49.5 ft./min. which was equivalent to about 1.25% $Al_2O_3$ addition to the $TiO_2$ pigment being produced in the reactor. Under similar operating rates but using enough aluminum chloride to provide the finished pigment with 1.5% $Al_2O_3$ the feed rate of the chlorine was 11.6 s.c.f.m. and the wire feed rate 59.6 ft. min. In another series of runs in which the vapor phase reactor was again operated at a 40 t./day rate 2.0% $Al_2O_3$ was added to the pyrogenic $TiO_2$ by feeding the aluminum wire into the heating zone at the rate of 79.3 ft./min., and mixing the atomized aluminum with gaseous chlorine being fed into the atomizer at the rate of 16.5 s.c.f.m.

Similar runs were made as described above but at the rate of 35 tons pigment per day. Thus for adding 1.25% $Al_2O_3$ to the pigment the aluminum wire feed rate was 43.4 ft./minute, atomization of the molten aluminum metal was done by chlorine fed at a rate of 8.5 s.c.f.m.; for a 1.5% $Al_2O_3$ addition the wire feed rate was 52.0 ft./minute and the chlorine feed rate 10.2 s.c.f.m. and for a 2.0% $Al_2O_3$ addition the wire feed rate was 69.3 ft./minute and the chlorine feed rate was 13.6 s.c.f.m.

In all of the foregoing runs the gaseous aluminum chloride was of uniform composition and generation of the aluminum chloride and mixtures thereof with gaseous $TiCl_4$ proceeded uniformly without sintering, hot spots or plugging.

While this invention has been described and illustrated by the examples shown, it is not intended to be strictly limited thereto, and other variations and modifications may be employed within the scope of the following claims.

What is claimed is:

1. Method for heating a mixture of gaseous titanium tetrachloride and oxygen to reaction temperature to produce titanium dioxide comprising: introducing gaseous titanium tetrachloride and oxygen into a reaction zone, continuously feeding aluminum metal, wherein said aluminum metal is fed from wire feed rolls continuously in the form of two lengths of aluminum wire the terminal ends of which constitute consumable electrodes of an electric arc, into a heating zone, continuously heating the aluminum metal being fed into said heating zone to melt said aluminum metal, simultaneously feeding a gas into said heating zone in immediate proximity to and at a rate sufficient to atomize said molten aluminum, feeding chlorine gas into said heating zone into contact with said atomzied molten aluminum to react therewith and form simultaneously gaseous aluminum chloride accompanied by development of exothermic heat of reaction, and feeding said gaseous aluminum chloride at temperature of said exothermic heat of reaction into said reaction zone to heat said gaseous titanium tetrachloride and oxygen to reaction temperature and form titanium dioxide accompanied by conversion of said gaseous aluminum chloride to aluminum oxide.

2. Method according to claim 1 for heating a mixture of gaseous titanium tetrachloride and oxygen to reaction temperature wherein the gas used to atomize said molten aluminum metal is selected from the group consisting of an inert gas, chlorine and mixtures thereof.

References Cited

UNITED STATES PATENTS

| | | | |
|---|---|---|---|
| 2,705,186 | 3/1955 | Hardy et al. | 23—93 |
| 3,043,657 | 7/1962 | Hughes et al. | 23—142 |
| 3,052,518 | 9/1962 | Frey | 23—93 |
| 3,443,897 | 5/1969 | Wilson et al. | 23—142 X |
| 3,446,579 | 5/1969 | Toomey et al. | 23—93 |
| 3,524,818 | 8/1970 | Bramekamp et al. | 23—93 X |
| 3,617,216 | 11/1971 | Arkless et al. | 23—142 |

EDWARD STERN, Primary Examiner

U.S. Cl. X.R.

423—613, 625; 23—277